United States Patent
Kumar et al.

(10) Patent No.: US 12,047,810 B2
(45) Date of Patent: Jul. 23, 2024

(54) REDUCING POSITIONING MEASUREMENT LATENCY IN WIRELESS NETWORKS

(71) Applicant: QUALCOMM Incorporated, San Diego, CA (US)

(72) Inventors: Akash Kumar, Hyderabad (IN); Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 526 days.

(21) Appl. No.: 17/488,731

(22) Filed: Sep. 29, 2021

(65) Prior Publication Data

US 2023/0098778 A1 Mar. 30, 2023

(51) Int. Cl.
*H04W 64/00* (2009.01)
*H04W 28/06* (2009.01)

(52) U.S. Cl.
CPC .......... *H04W 28/06* (2013.01); *H04W 64/00* (2013.01)

(58) Field of Classification Search
None
See application file for complete search history.

(56) References Cited

U.S. PATENT DOCUMENTS

2021/0076275 A1 3/2021 Yiu et al.
2021/0329618 A1* 10/2021 Chervyakov ......... H04W 72/54

FOREIGN PATENT DOCUMENTS

WO 2021205004 A1 10/2021

OTHER PUBLICATIONS

Apple: "On New Positioning Measurement Gaps", 3GPP TSG-RAN4 Meeting #96-e, R4-2009913, 3rd Generation Partnership Project, Mobile Competence Centre, 650, Route Des Lucioles, F-06921 Sophia-Antipolis Cedex, France, vol. RAN WG4, No. Online, Aug. 17, 2020-Aug. 28, 2020, Aug. 7, 2020, 5 Pages, XP051916982, paragraph [0002].
International Search Report and Written Opinion—PCT/US2022/041358—ISA/EPO—Dec. 13, 2022.
Moderator (Ericsson): "Email Discussion Summary for [96e] [217] NR_pos_RRM_Part_3", 3GPP TSG-RAN WG4 Meeting# 96-e, R4-2012048, 3rd Generation Partnership Project, Mobile Competence Centre, 650, Route Des Lucioles, F-06921 Sophia-Antipolis Cedex, France, vol. RAN WG4, No. Electronic Meeting, Aug. 17, 2020-Aug. 28, 2020, Aug. 30, 2020, 35 Pages, XP051923506, Apple contribution, p. 4 Issue 1-2-3, Nokia contribution, p. 14.

(Continued)

*Primary Examiner* — Suhail Khan
(74) *Attorney, Agent, or Firm* — SUNSTEIN LLP/Qualcomm

(57) ABSTRACT

Techniques are provided for reducing the delay in accumulating positioning measurements and improving positioning latency. An example method for reducing positioning measurement latency in a wireless network includes receiving assistance data including configuration information for a plurality of positioning reference signals, determining measurement gap requirements, requesting measurement gaps based on the measurement gap requirements, receiving measurement gap configuration information, determining a mobility state, and measuring or transmitting one or more positioning reference signals based at least in part on the measurement gap configuration information and the mobility state.

30 Claims, 13 Drawing Sheets

(56) References Cited

OTHER PUBLICATIONS

Qualcomm Incorporated: "On Impact of NR Positioning on Existing RRM Requirements", 3GPP TSG-RAN WG4 Meeting #95-e, R4-2006173, 3rd Generation Partnership Project (3GPP), Mobile Competence Centre, 650, Route Des Lucioles, F-06921 Sophia-Antipolis Cedex, France, vol. RAN WG4, No. Online, May 25, 2020-Jun. 5, 2020, May 15, 2020, 9 Pages, XP051883297, paragraph [0003] paragraph [0005].

Vivo: "Discussion on Physical-Layer Procedures for UE/gNB Measurements", 3GPP TSG RAN WG1 #97, R1-1906180, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, 6 Pages, XP051727634, paragraph [0002].

* cited by examiner

REDUCING POSITIONING MEASUREMENT LATENCY IN WIRELESS NETWORKS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements. Improvements in the timing and detection of reference signals may be used to increase positioning accuracy and reduce power consumption in a mobile device.

SUMMARY

An example method for increasing a number of measurement gaps for positioning measurements according to the disclosure includes receiving a request for measurement gaps from a user equipment, and sending an indication to relax mobility measurements to the user equipment.

Implementations of such a method may include one or more of the following features. The indication to relax the mobility measurement may include at least one of a signal level power threshold value or a signal quality threshold value to define a low mobility state. The indication to relax the mobility measurements may include a mobility measurement periodicity value for relaxed mobility measurements. The mobility measurement periodicity value may be based at least in part on a measured mobility reference signal received power level. The indication to relax mobility measurements may include time period information defining a duration to relax the mobility measurements. The indication to relax the mobility measurements may include a scaling factor to modify a mobility measurement periodicity. The indication to relax the mobility measurements may include a best cell parameter to enable the user equipment to monitor a subset of neighboring cells for mobility measurements based on a reference signal received power value or a reference signal received quality value. An indication to tighten the mobility measurements may be sent to the user equipment. The request for the measurement gaps may include a time window parameter, and the indication to relax the mobility measurements is sent based at least in part on the time window parameter. The indication to relax the mobility measurements may be sent via a radio resource control message. The indication to relax the mobility measurements may be based at least in part on a positioning quality of service requirement.

An example method for reducing positioning measurement latency in a wireless network according to the disclosure includes receiving assistance data including configuration information for a plurality of positioning reference signals, determining measurement gap requirements, requesting measurement gaps based on the measurement gap requirements, receiving measurement gap configuration information, determining a mobility state, and measuring or transmitting one or more positioning reference signals based at least in part on the measurement gap configuration information and the mobility state.

Implementations of such a method may include one or more of the following features. Measuring or the transmitting one or more positioning reference signals may occur during a mobility measurement gap repurposed for positioning measurements. Measuring one or more positioning reference signals may include receiving a downlink positioning reference signal, and the transmitting one or more positioning reference signals may include transmitting an uplink sounding reference signal for positioning.

Items and/or techniques described herein may provide one or more of the following capabilities, as well as other capabilities not mentioned. A user equipment may determine positioning reference signal transmission schedules for one or more base stations operating on one or more frequency layers. The user equipment may request measurement gap information from the base stations. The measurement gap information may be associated with mobility measurements such as Radio Resource Monitoring (RRM) and Radio Link Monitoring (RLM). The user equipment may be in a low mobility state and a serving station may relax the requirements for mobility measurements. The relaxation of mobility measurements may enable the user equipment to utilize some mobility measurement gaps to send or receive positioning reference signals. The repurposed mobility measurement gaps may increase the number of measurement gaps available for positioning purposes. Latency issues associated with obtaining positioning measurements may be reduced. Positioning accuracy may be improved. Other capabilities may be provided and not every implementation according to the disclosure must provide any, let alone all, of the capabilities discussed.

DETAILED DESCRIPTION

Figure 1:
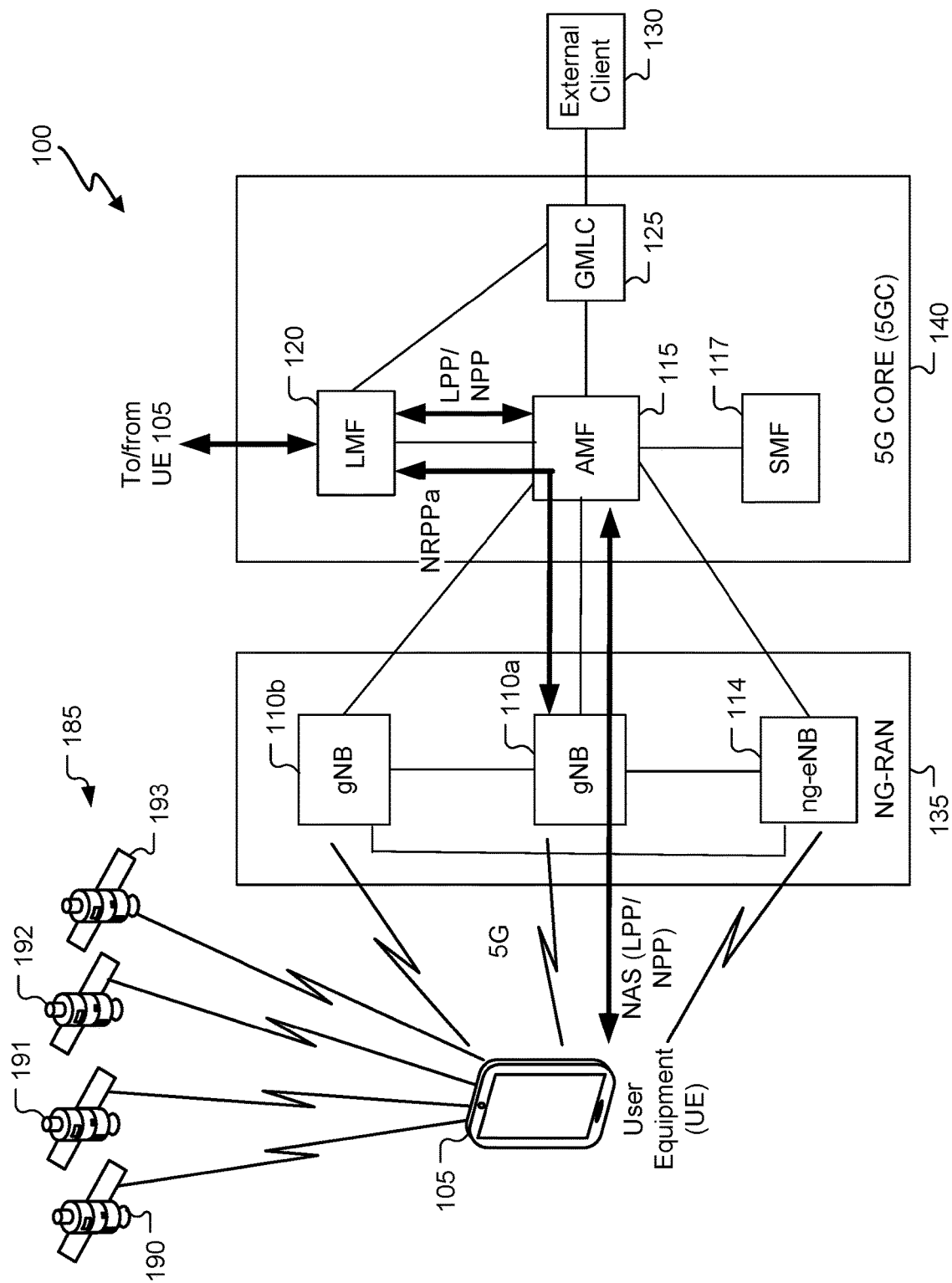
FIG. 1 is a simplified diagram of an example wireless communications system.

Techniques are discussed herein for reducing the delay in accumulating positioning measurements and improving positioning latency. Base stations may be configured to transmit reference signals, such as positioning reference signals (PRS), in one or more bands. The bands may be in different frequency layers and may include different component carriers. A user equipment (UE) may be configured to measure downlink (DL) PRS transmitted from multiple cells, and using those measurements to determine a position estimate (e.g., via multilateration techniques). In general, intra-frequency measurements within a band may be performed without the need to retune when the UE is tuned to the serving cell. In contrast, the UE may require measurement gaps (MGs) to measure inter-frequency PRS (e.g., transmitted by different cells in different bands). Multiple MGs may be required to enable a UE to accumulate and/or average multiple measurements for each inter-frequency neighbor. A serving base station (e.g., gNB) may configure default MGs to support positioning processes. These default MGs, however, may not be suited or aligned with the transmission schedules for the PRS to enable the UE to obtain PRS measurements and determine a position estimate. In this case, the UE may be configured to request more MGs from the base station, and the base station may or may not be capable of providing the additional MGs. Due to the limited number of MGs available (e.g., the default MGs and the requested additional MGs), of which some may be used for mobility measurement purposes (e.g., RRM/RLM measurements), additional time may be needed to enable the UE to accumulate the required number of measurements to obtain a position estimate. This additional time leads to additional delay and latency in gathering the positioning measurements.

In an example, a UE may receive a positioning measurement request and assistance data from a location server. The measurement request may require inter-frequency measurements and the UE may determine a number of MGs required to receive DL PRS and/or transmit UL PRS (e.g., UL Sounding Reference Signals (SRS) for positioning). The required number of MGs may exceed the default number of MGs configured on the UE, and the UE may request additional MGs from the serving cell (e.g., a serving gNB).

The UE may be configured to determine a mobility state based on RRM and RLM measurements. The serving gNB may be configured to allocate additional MGs to the UE, if available. In the alternative, or in addition to, the gNB may also provide instructions to the UE to relax mobility measurements if the UE is in a low mobility state. In an example, the gNB may provide dedicated MGs for positioning and instructions to enable the UE to repurpose a subset of existing RRM measurement gaps. In an example, the instructions to relax the mobility measurements may indicate a time period to relax the measurements. In an example, a Quality of Service (QoS) parameter may be use to determine a number RRM measurement gaps to utilize. The instructions may include signal parameters to evaluate the relaxation criterion. Other parameters as described herein may be included in the instructions. The relaxation of the mobility measurements may increase the number of measurement gaps the UE may utilize to obtain positioning measurements. The increased positioning measurements may reduce the latency in obtaining a position estimate for the UE, and may improve the quality of the resulting position estimates. These techniques and configurations are examples, and other techniques and configurations may be used.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs (e.g., the gNB 110*a*, gNB 110*b*, ng-eNB 114) may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), Signal to Interference and Noise Ratio (SINR) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
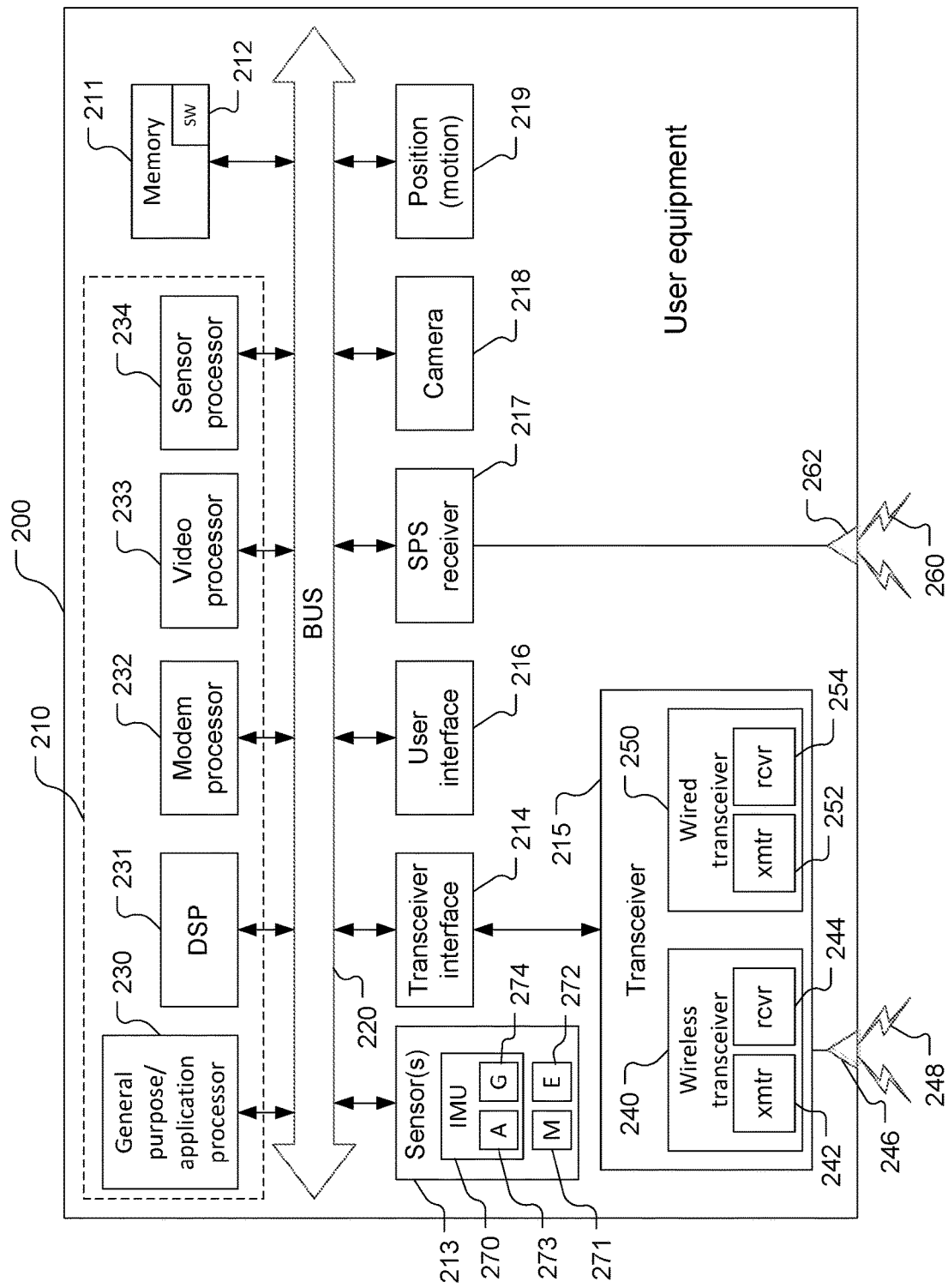
FIG. 2 is a block diagram of components of an example user equipment.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and/or a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-everything (V2X) (PC5), V2C (Uu), IEEE 802.11 (including IEEE 802.11p), WiFi, WiFi Direct (WiFi- D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
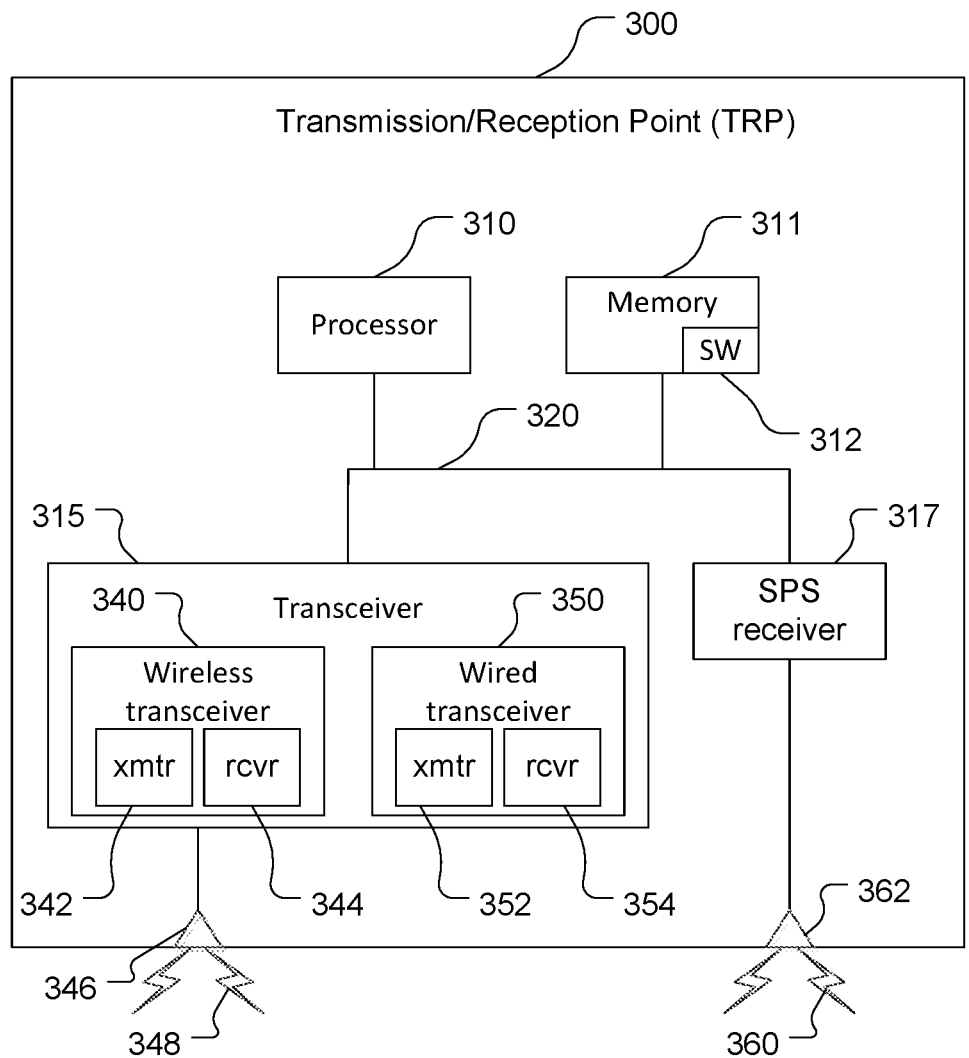
FIG. 3 is a block diagram of components of an example transmission/reception point.

Referring also to FIG. 3, an example of a TRP 300 of the BSs, such as the gNB110a, gNB 110b, ng-eNB 114, comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels, downlink channels and/or sidelink channels) and/or receiving (e.g., on one or more downlink channels, uplink channels, and/or sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
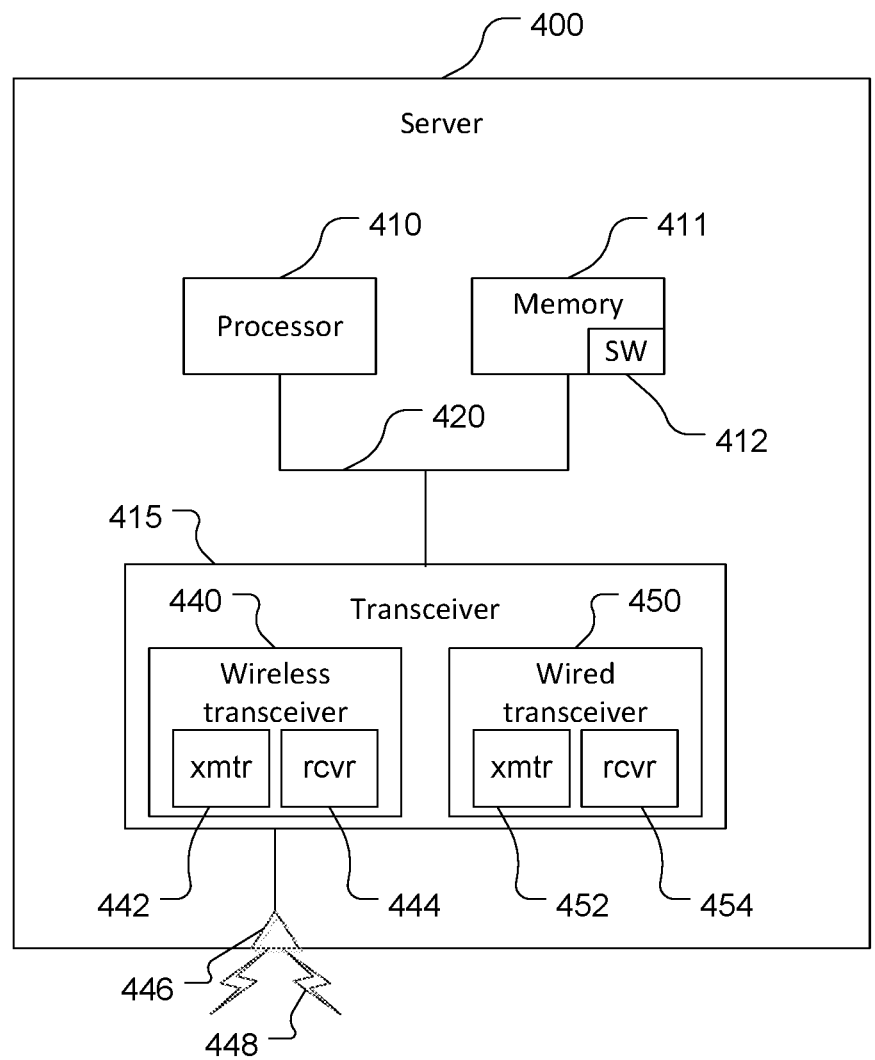
FIG. 4 is a block diagram of components of an example server.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
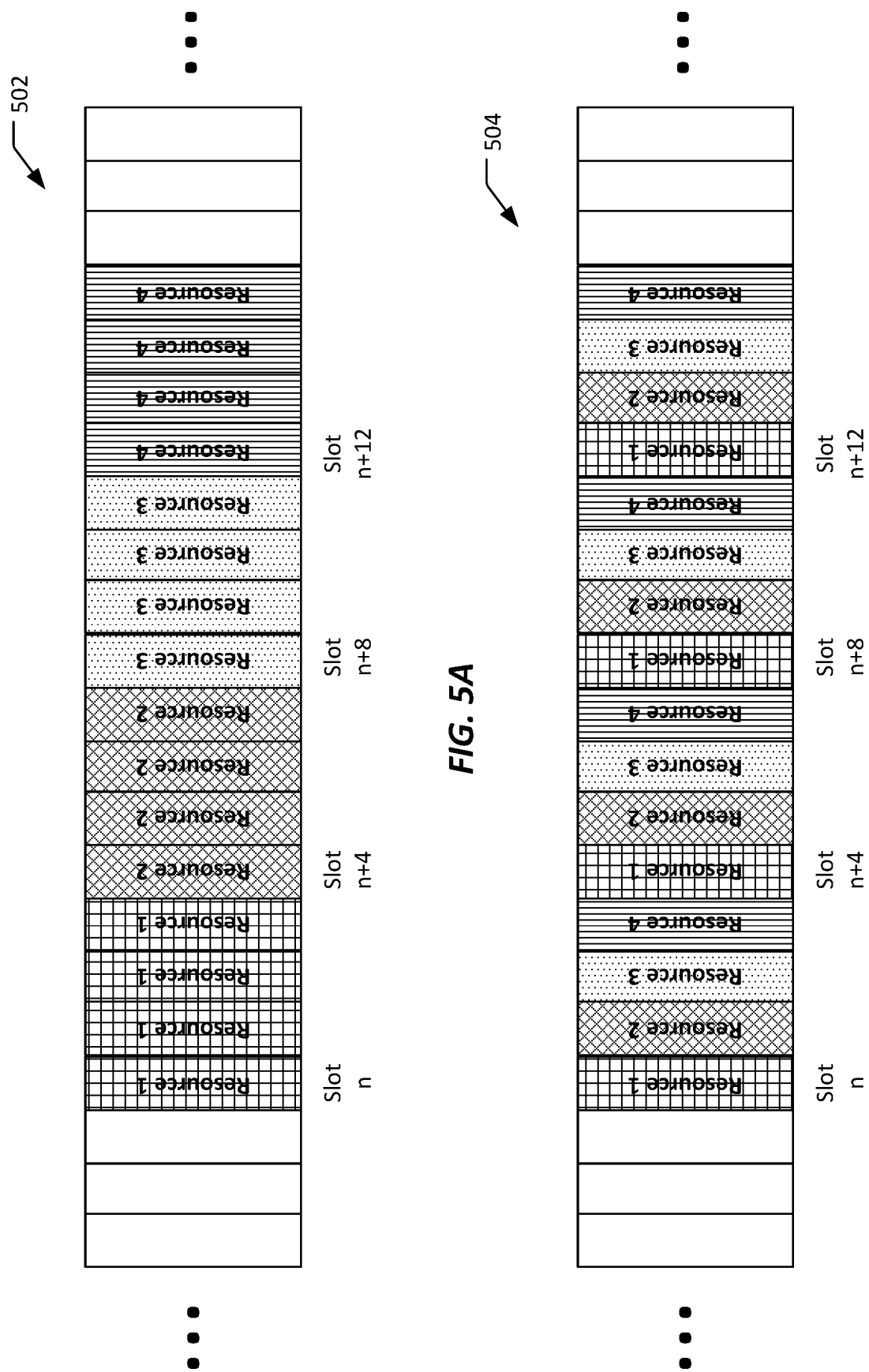
FIGS. 5A and 5B illustrate example downlink positioning reference signal resource sets.

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
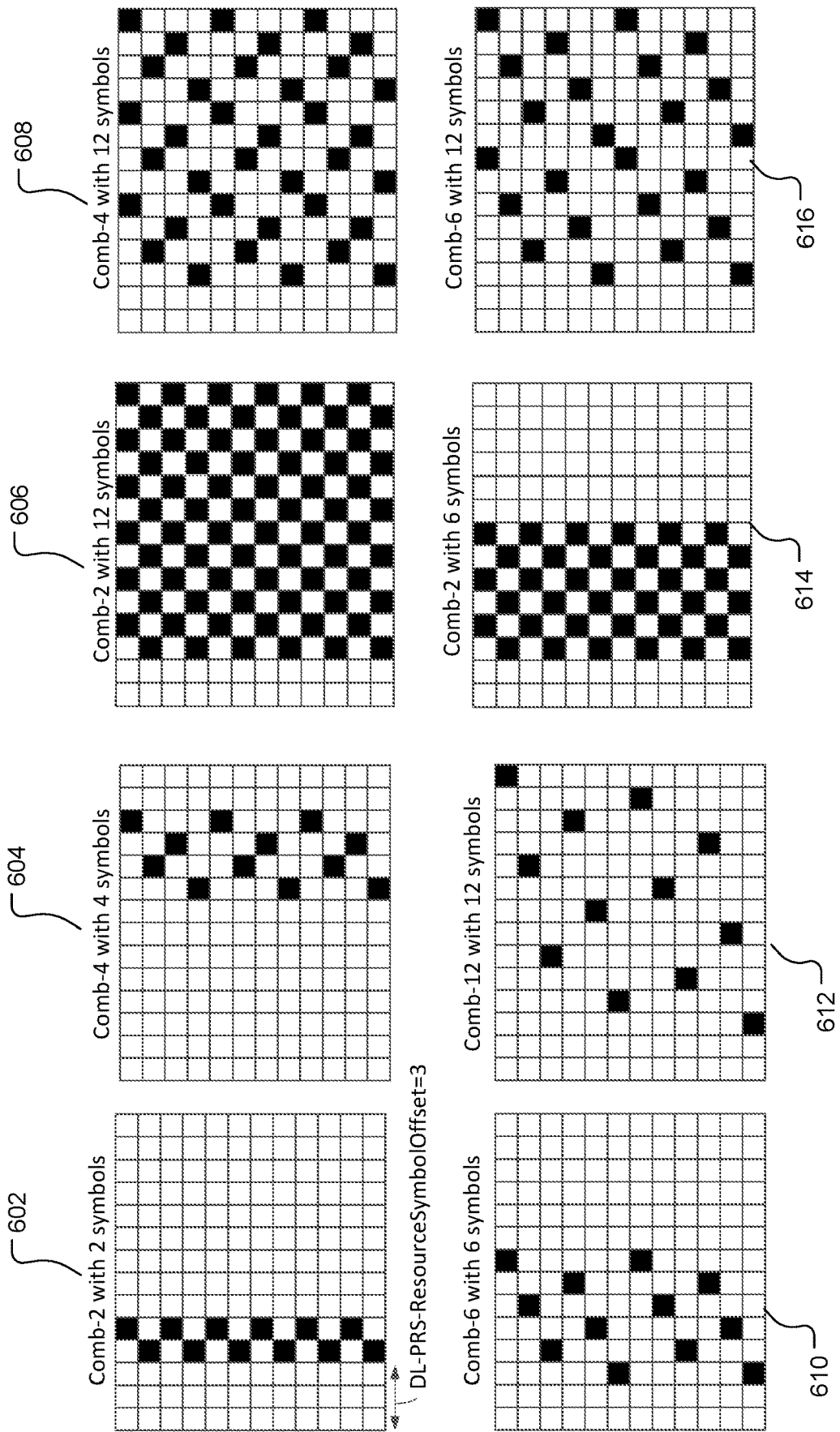
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters: PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

In an example, a positioning frequency layer may be a collection of PRS resource sets across one or more base stations. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS.

A PRS occasion is one instance of a periodically repeated time window (e.g., a group of one or more consecutive slots) where PRS are expected to be transmitted. A PRS occasion may also be referred to as a PRS positioning occasion, a positioning occasion, or simply an occasion.

Note that the terms positioning reference signal and PRS are reference signals that can be used for positioning, such as but not limited to, PRS signals in LTE, navigation reference signals (NRS) in 5G, downlink position reference signals (DL-PRS), uplink position reference signals (UL- PRS), tracking reference signals (TRS), cell-specific reference signals (CRS), channel state information reference signals (CSI-RS), primary synchronization signals (PSS), secondary synchronization signals (SSS), sounding reference signals (SRS), etc.

Figure 7:
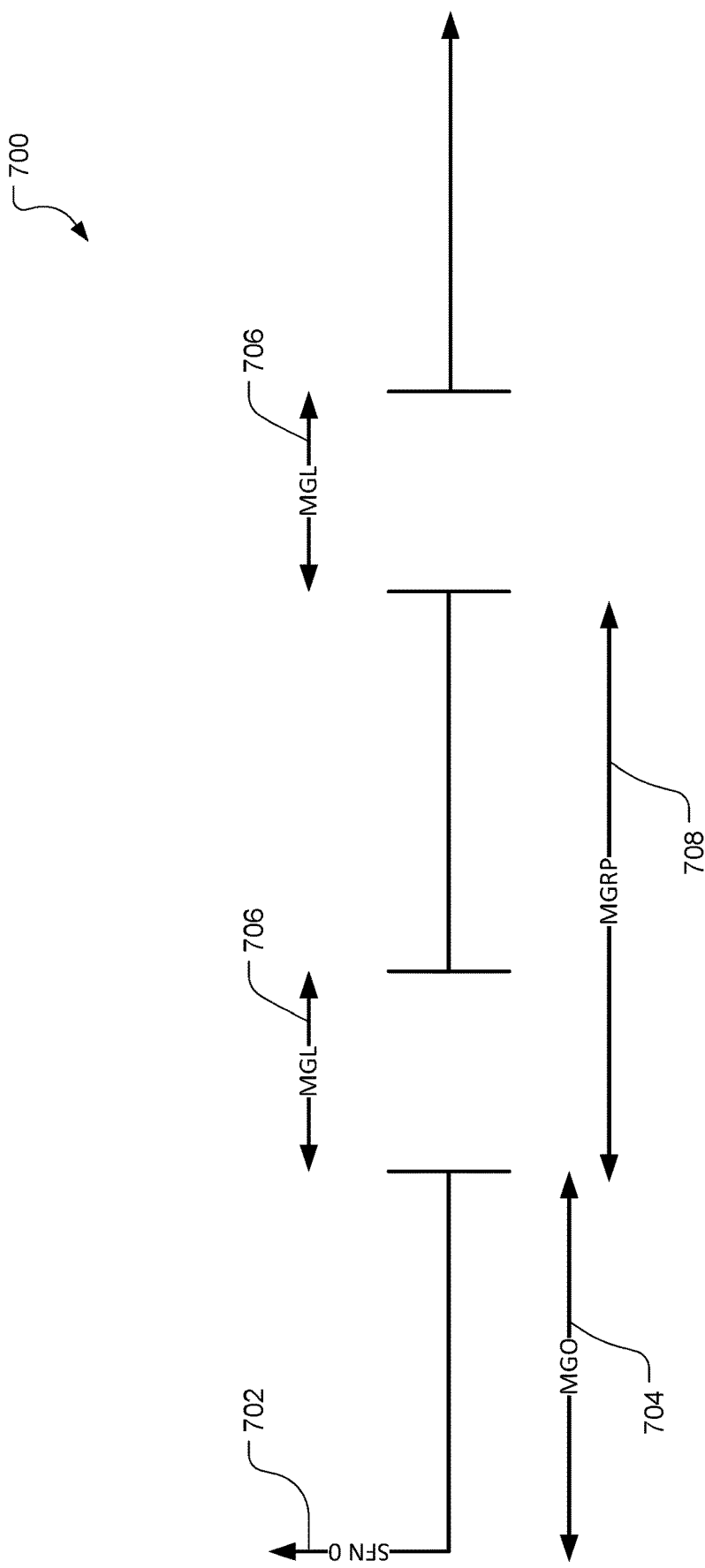
FIG. 7 is a timing diagram of an example measurement gap.

Referring to FIG. 7, a timing diagram 700 of an example measurement gap is shown. Measurement gaps may be used by the UE 200 to perform measurements which cannot be accomplished while the UE 200 is communicating with a serving cell. During the measurement gap, the uplink and downlink data transfers are interrupted. The UE 200 may use the measurement gaps for PRS and RRM measurements. In LTE systems, the measurement gaps may be used for inter-frequency and inter-system measurements. The measurement gaps provide additional time to allow the UE 200 to re-tune its transceiver to the target band (e.g., carrier), obtain measurements, and then re-tune the transceiver back to the original carrier. The re-tuning operations may require up to 0.5 ms. In NR systems, the measurement gaps may be used for intra-frequency measurements, in addition to inter-frequency and inter-system measurements. A NR UE may be configured to utilize bandwidth parts (BWPs). In an example, the UE may be configured with an active BWP which does not contain the intra-frequency SS/PBCH block, and the UE may have to re-tune its transceiver to receive the intra-frequency SS/PBCH block. A base station, such as the gNBs 110a-b and the ng-eNB 114, may be configured to generate and provide measurement gap information to the UEs. For example, the base station may transmit measurement gap configuration information elements such as a measurement gap offset (MGO) 704 which can be measured from a frame or subframe boundary 702. A measurement gap length (MGL) 706 indicates the duration of a measurement gap. The MGL 706 is typically in a range of 1.5 to 6 ms. The measurement gap repetition period (MGRP) 708 defines the period between consecutive measurement gaps. 3GPP TS 38.133 specifies gap patterns based on combinations of the MGL 706 and the MGRP 708. For example, the MGL 706 values may vary from 1.5 to 6 ms, and the MGRP 708 values may vary from 20 to 160 ms. The MGL 706 may be further limited to accommodate UE tuning times. The measurement gap information may be exchanged via Radio Resource Control (RRC) signaling, or via other network interfaces.

Figure 8:
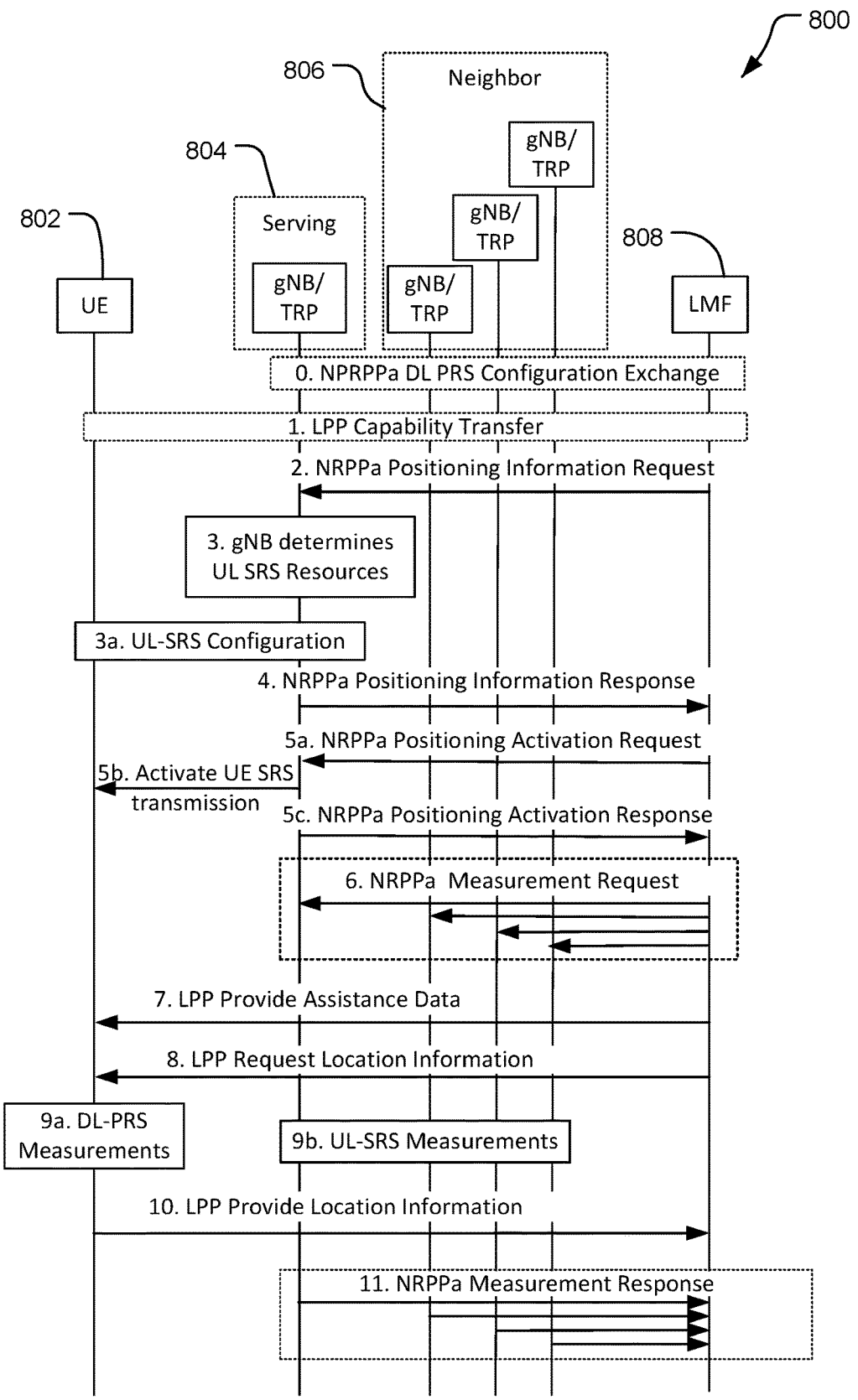
FIG. 8 is an example message flow for obtaining location information.

Referring to FIG. 8, an example message flow 800 for obtaining location information is shown. The flow 800 is an example only, as stages may be added, rearranged, and/or removed. The message flow 800 may include a target UE 802, a serving station 804, a plurality of neighboring stations 806, and a server 808. The UE 200 may be an example of the target UE 802, a TRP 300 such as the gNB 110a may be an example of the serving station 804, and a server 400 such as the LMF 120 may be an example of the server 808. The plurality of neighboring stations 806 may include base stations such as the gNB 110b, the eNB 114, or other stations such as neighboring UEs (e.g., configured for sidelink or other D2D communications). At step 0, the server 808 may send and receive PRS configuration information to and from a plurality of network nodes including the serving station 804 and the neighboring stations 806. At step 1, the server 808 may request positioning capabilities from the target UE 802 via one or more LPP messages. At step 2, the server 808 may request UL-SRS configuration information for the target UE 802 from the serving station 804. The server 808 may provide assistance data to the serving station 804 including reference signal transmission properties such as a pathloss reference, spatial relation information, Synchronization Signal Block (SSB) configuration information, or other information required by the serving station 804 to determine a range to the target UE 802. At step 3, the serving station 804 is configured to determine the resources available for UL-SRS and configured the target UE 802 with the UL-SRS resource sets. At step 3a, the serving station 804 may provide the UL-PRS configuration parameters to the target UE 802 in one or more Radio Resource Control (RRC) messages. At step 4, the serving station 804 provides the UL-PRS configuration parameters to the server 808.

At step 5a, the server 808 may send a NRPPa Positioning Activation Request message to the serving station 804 to request activation of the UL-PRS in the target UE 802 according to one or more configurations provided to the target UE 802 at step 3a. At step 5b, the serving station 804 may send an activation signal, such as a MAC Control Element, to the target UE 802 to activate the UL-PRS as requested at step 5a. If a start time was provided at step 5a, the serving station 804 may send this command at the requested start time. At step 5c, if the UL-PRS has been successfully activated, the serving station 804 may return a NRPPa Positioning Activation Response message to the server 808. At step 6, the server 808 may send a NRPPa Measurement Request message to the serving station 804 and neighbor stations 806 to request UL-PRS measurements (e.g., gNB Rx-Tx Time Difference Measurements). At step 7, the server 808 may provide assistance data to the target UE 802 in a LPP assistance data message. At step 8, the server 808 sends a LPP request location information message to request positioning measurements. At step 9a, the target UE 802 acquires and measures the DL-PRS transmitted by the serving stations 804 and neighboring stations 806, and at step 9b the stations 804, 806 which received the measurement request at step 6, may acquire and measure the UL-PRS transmitted by the target UE 802. As described herein, the target UE 802 may request additional measurement gaps from the gNB to measure the DL-PRS and/or transmit the UL-PRS. the serving station 804 may relax the mobility measurements for the target UE 802 to increase the number of measurement gaps available to the target UE 802. At step 10, the target UE 802 provides the DL-PRS measurement information/location estimate to the server 808 in a LPP Provide Location Information message. At step 11, the stations 804, 806 provide NRPPa Measurement Report messages based on the UL-PRS measurements to the server 808.

Figure 9:
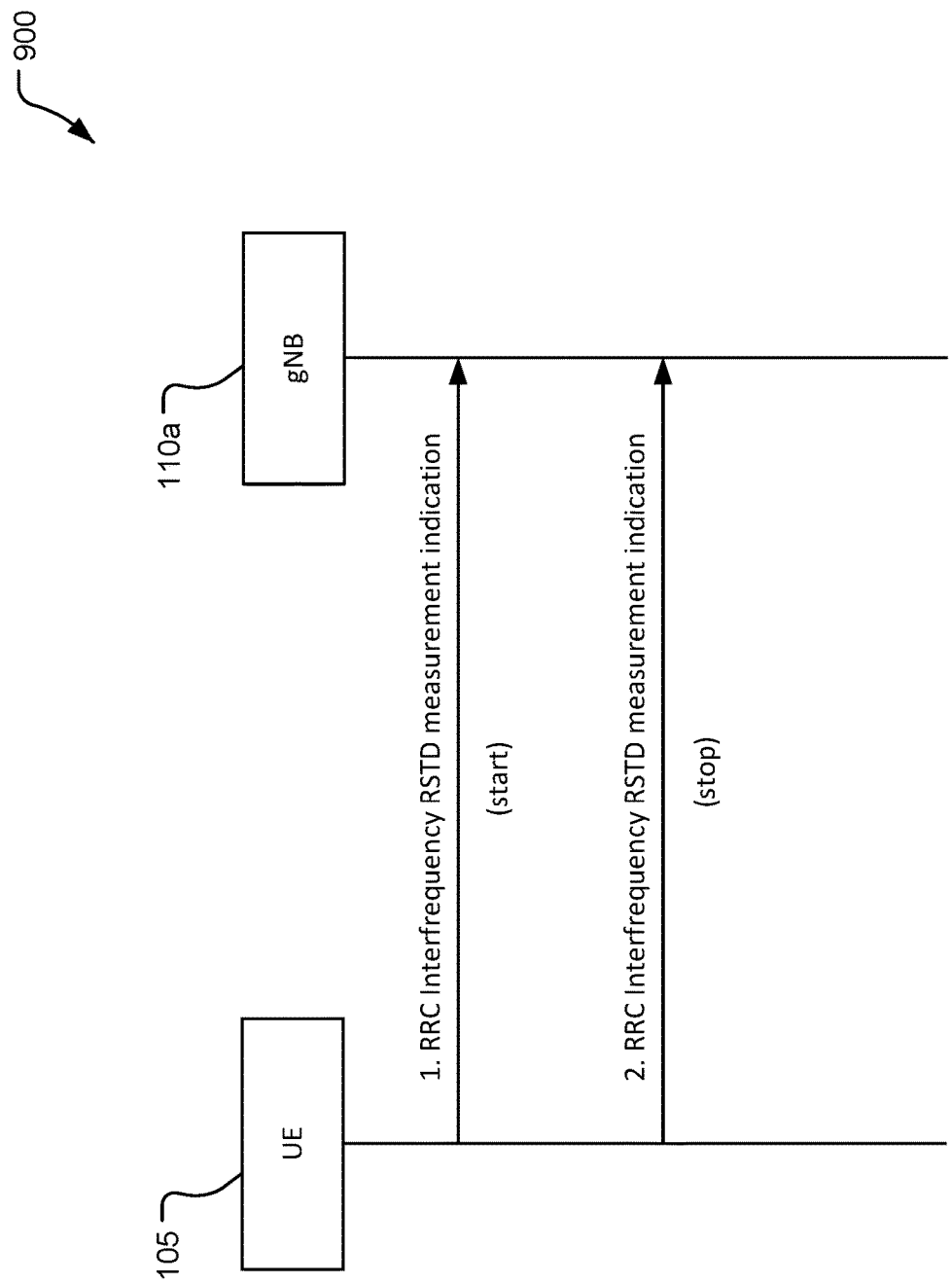
FIG. 9 is an example message flow for requesting measurement gap information.

Referring to FIG. 9, an example message flow 900 for signaling a measurement gap request is shown. The message flow 900 may extend the existing inter-frequency RSTD measurement indication procedure to enable the UE 105 to request additional measurement gaps from a serving gNB, such as the gNB 110a. In an example, the UE 105 may receive a LPP request message from the LMF 120 to obtain inter-frequency RSTD measurements for OTDOA positioning. If the UE 105 is not aware of and cannot derive the subframe timing difference between the serving cell and the OTDOA assistance data reference cell, the UE 105 may request additional measurement gaps to perform cell detection for the OTDOA assistance data reference cell prior to requesting measurement gaps for performing the requested positioning measurements.

Figure 10:
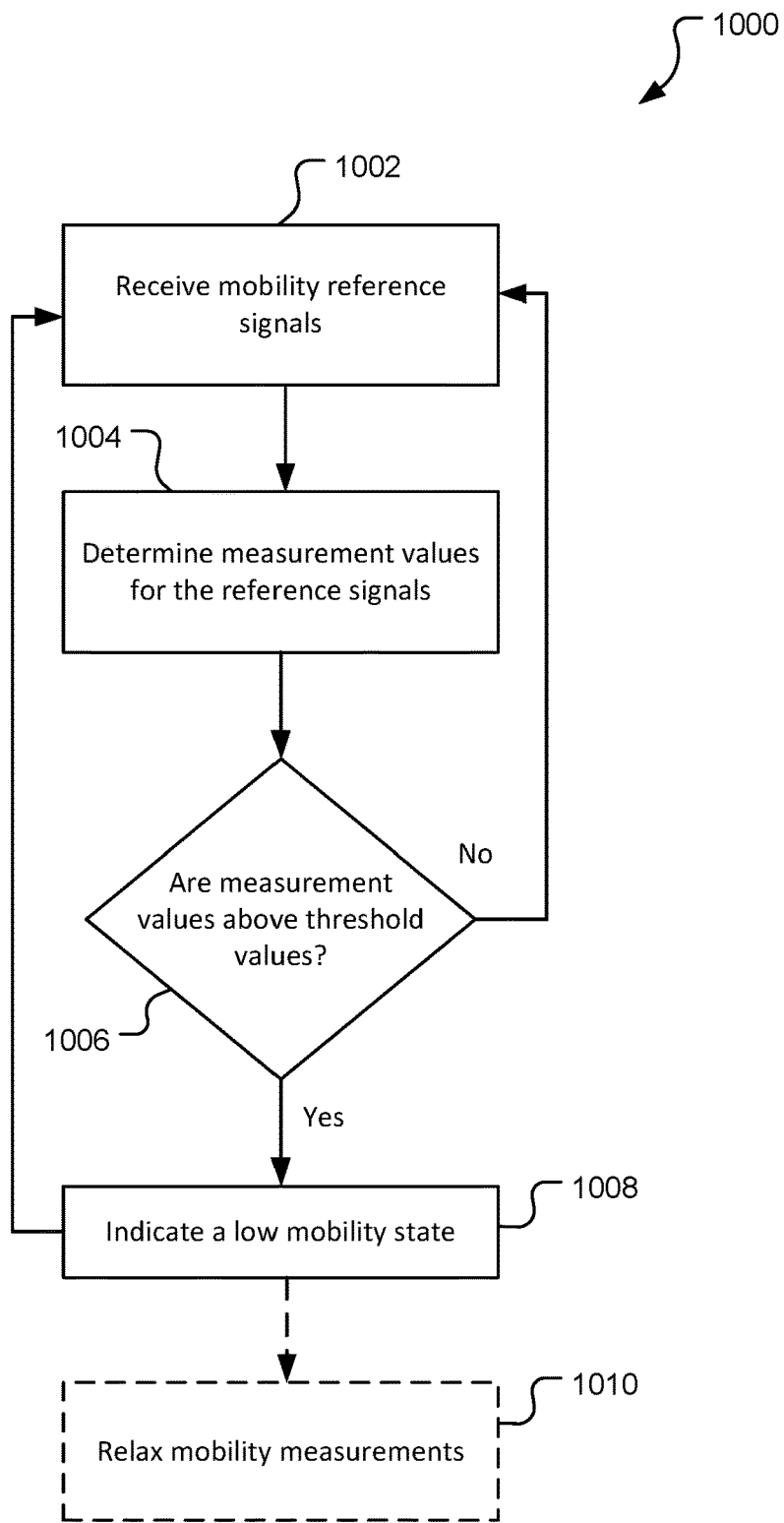
FIG. 10 is a process flow of an example method for determining a mobility state.

Referring to FIG. 10, with further reference to FIG. 1, a method 1000 for determining a mobility state includes the stages shown. The method 1000 is, however, an example and not limiting. The method 1000 may be altered, e.g., by having stages added, removed, rearranged, combined, performed concurrently, and/or having single stages split into multiple stages.

At stage 1002, the method includes receiving mobility reference signals. A UE 200, including the processors 210 and the transceiver 215, is a means for receiving the mobility reference signals. In general, the communications network 100 may utilize RSRP, RSRQ and SINR measurements as mobility reference signals for UE mobility and other RRC connection procedures. RSRP measurement values indicate the signal strength of the target. RSRQ measurements capture both the signal strength and the load of the target. SINR provides a measure of the signal quality in the target. These measurements may be performed either on a SS/PBCH block or on a single-port CSI-RS. The RSRP and RSRQ measurements may be available in IDLE, INACTIVE and CONNECTED modes, whereas the SINR measurement is applicable only in CONNECTED mode. All CSI-RS measurements are only applicable in CONNECTED mode. The mobility reference signals maybe transmitted by the current serving cells (e.g., primary and secondary cells), as well as neighboring cells.

At stage 1004, the method includes determining measurement values for the reference signals. The UE 200, including the processor 210 and the transceiver 215, is a means for determining the measurement values. The RSRP is a measure of the signal strength of a beam and may be defined as the linear average over the power contributions of the resource elements that include the secondary synchronization signals or the CSI-RS. In an example, the UE 200 may also use the PBCH DMRS to improve the accuracy of the RSRP measurements. The RSRQ and SINR may indicate an interference level of the frequency layer of a cell corresponding to a RSRP measurement. The RSRQ is defined as the RSRP/RSSI. RSSI indicates a linear average of the total received power in certain resource elements (e.g., it reflects all transmissions of all neighbor cells on the resource elements during the measurement period). SINR indicates the interference of a target signal and may be defined as the RSRP/(I+N), where (I+N) is the linear average of the interference and noise measured in the same resource elements where the corresponding reference signals are transmitted.

At stage 1006, the method includes determining if the measurement values are above threshold values. The UE 200, including the processors 210, is a means for determining if the measurement values are above threshold values. In an example, the threshold values may be previously stored values in the memory 211 and may be used to determine whether the reference signals are degrading from measurement period to measurement period. For example, decreasing and/or degrading signals may indicate the UE 200 is in motion and may be used to initiate a handoff procedure. The degrading measurement values may be used to indicate the UE 200 is in a high mobility state. Conversely, steady measurement values may indicate the UE 200 is in a low mobility state. In an example, another network station, such as the gNB 110a or the LMF 120, may be configured to provide the threshold values to the UE 200. For example, a serving gNB may be configured to utilize threshold values for the RSRP and RSRQ values to define the high and low mobility states. As used herein, the mobility measurements for UE in a low mobility state may be relaxed to repurpose mobility measurement gaps for obtaining positioning measurements. For example, in response to indicating that the UE 200 is in a low mobility state at stage 1008, the gNB may relax the mobility measurements from every 5 frames to every 10 frames. Other periods may be used. In an example, the difference between the measured values and the threshold may be used to determine the periodicity (e.g., measurements at, or slightly above, the threshold values may indicate a first periodicity, and measurements well above the threshold values may indicate a second periodicity value which is longer than the first periodicity value). The method 1000 may iterate to periodically verify and/or update the mobility state.

At stage 1010, the method may optionally include relaxing mobility measurements. The UE 200, including the processors 210, is a means for relaxing mobility measurements. The an embodiment, the UE 200 may be configured determine the low mobility state based on the mobility reference signals received at stage 1002, and then autonomously relax RRM measurements to repurpose a subset of those measurement gaps for positioning measurements.

Figure 11:
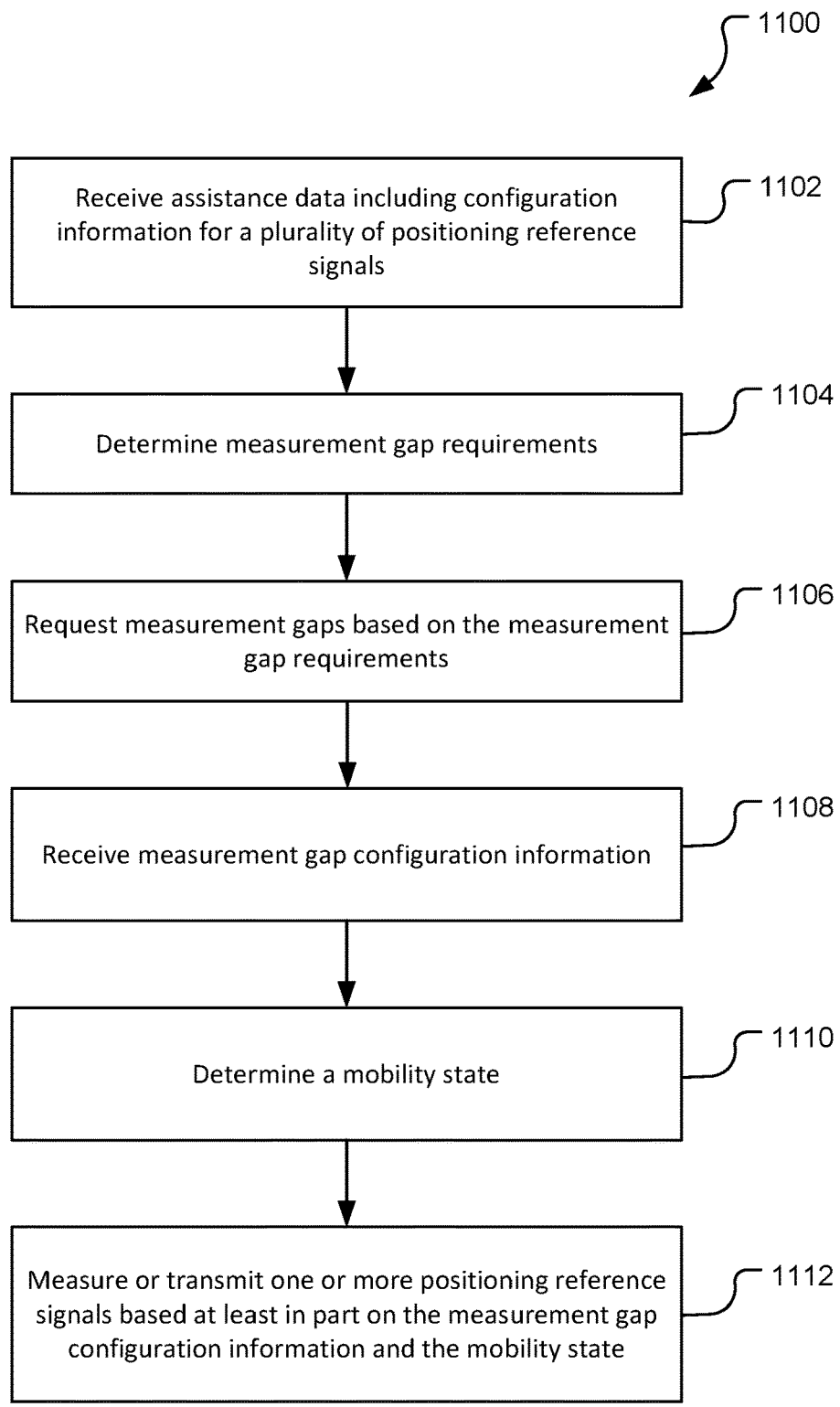
FIG. 11 is a process flow of an example method for reducing positioning measurement latency in a wireless network

Referring to FIG. 11, with further reference to FIGS. 1-10, a method 1100 for reducing positioning measurement latency in a wireless network includes the stages shown. The method 1100 is, however, an example and not limiting. The method 1100 may be altered, e.g., by having stages added, removed, rearranged, combined, performed concurrently, and/or having single stages split into multiple stages.

At stage 1102, the method includes receiving assistance data including configuration information for a plurality of positioning reference signals. A UE 200, including a general-processor 230 and a transceiver 215, is a means for receiving the assistance data. A network resource, such as the LMF 120 may be configured to provide assistance data associated with DL PRS resources in one or more LPP provide assistance data messages. The DL-PRS may be associated with PRS resource sets, such as depicted in FIGS. 5A and 5B. In an example, a serving station 804 (such as the gNB 110a) may provide the UE with UL-SRS configuration information. The assistance data includes timing information associated with the transmission of DL-PRS from the neighboring stations and transmission periods for the UE 200 to transmit UL-SRS, which may be received by a serving station and/or one or more neighboring stations. In an example, the assistance data may be included in a positioning request and associated with a time period for determining a position estimate for the UE 200. The time period may be based on a current or future time, and may include a time-out factor indicating when the positioning measurements have to be obtained and/or reported to a location server.

At stage 1104, the method includes determining measurement gap requirements. The UE 200, including the general-processor 230 and the transceiver 215, is a means for determining MG information. The serving station 804 is configured to provide MG information to the UE 200 via RRC for positioning measurements and other default purposes, such as mobility. The MG information, such as depicted in FIG. 7, may have a certain periodicity (e.g., MGRP 708) and pattern (e.g., MGL 706 and MGO 704). The UE 200 is configured to compare the MG information with the positioning assistance data timing information (e.g., meas-config IE parameters) to determine the MG requirements. In an example, the UE 200 may determine there is a misalignment between the positioning measurement timing and the available MGs and/or determine that there are and insufficient number of MGs available within a positioning time period (e.g., before the positioning session time-out factor). The number of positioning measurements may vary based on geographic and other operational considerations such as the distribution of neighboring cells, the range and signal strengths of the neighboring cells, and other signal quality factors such as the presence of multipath. For example, distant stations may require multiple measurements based on lower received signal strength. Dilution of Precision (DOP) methods may be used to determine the number of measurement gaps the UE 200 should measure to obtain a position estimate. For example, fewer positioning measurements may be needed for geographically diverse stations. In an example, the required number of positioning measurements and/or measurement gaps may be based on predetermined values (e.g., a look up table) associated with a coarse location of the UE 200 (e.g., based on mobility tracking information). Other factors may also be used to determine the number of positioning measurements and a corresponding number of measurement gaps. For example, a QoS requirement for a location estimate based on an application or use case requirement may be used to determine the number of gaps to use and/or repurpose for obtaining a position estimate.

At stage 1106, the method includes requesting measurement gaps based on the measurement gap requirement. The UE 200, including the general-processor 230 and the transceiver 215, is a means for requesting the MGs. The MG requirements determined at stage 1104 may indicate additional MGs are required, and the UE 200 may send a RRC Location Measurement Indication (e.g., as described in FIG. 9) to request additional MGs from the gNB. In an example, the gNB may determine whether additional MGs are available in view of the request and provide additional MG configuration information to the UE 200 to enable the UE 200 to obtain the positioning measurements. In an example, the gNB may determine that there are insufficient MGs available and may signal the UE 200 to relax mobility measurements (e.g., RRM/RLM monitoring) to enable the UE 200 to repurpose the mobility MGs for positioning when the UE 200 is in a low mobility state.

At stage 1108, the method includes receiving measurement gap configuration information. The UE 200, including the general-processor 230 and the transceiver 215, is a means for receiving the MG configuration information. In an example, the gNB may provide the MG configuration information to the UE 200 via RRC messaging. The MG configuration information may include additional MGs and/or an indication for the UE 200 to relax the mobility measurements. For example, the MG configuration information may indicate that the UE 200 may relax mobility measurements from every 5 frames to every 10 frames when the UE 200 is in a low mobility state. Other periods may also be used. In an example, the gNB may provide the UE 200 with additional signal strength and signal quality metrics (e.g., threshold values) to be used during positioning for evaluating mobility relaxation criterion. For example, if a received signal strength level ($S_{rxlev}$) is greater than a threshold value (e.g., $S_{noIntraSearchPos}$) and a received signal quality ($S_{qual}$) is greater than a threshold value (e.g., $S_{noIntraSearchQPos}$), then the UE 200 may determine it is in a low mobility state. In an example, the gNB may configure the MG configuration information to indicate a combination of dedicated MGs for positioning and a subset of existing RRM MGs to be used fully or shared for positioning for a specific time period. The MG configuration information may include a time period in which the mobility relaxation may occur (e.g., as a function of the positioning session timeout period). The mobility measurements may be tightened (e.g., utilize the mobility MGs fully for RRM/RLM purposes) upon the expiration of the time period. In an example, the gNB may send a signal to end the mobility measurement relaxation. In an example, the MG configuration information may indicate to relax mobility measurements for specific sets of frequencies and/or not to relax higher priority frequency, or relax lower priority frequencies. The priority of the frequencies may be based on local interference, load balancing, and/or the capabilities of the UE 200. In an example, the MG configuration information may include a scaling factor 'n' and the UE 200 may be configured to apply the scaling factor to previously configured MG periodicity and other MG objects. The scaling factor 'n' may be utilized to reduce RRC level signaling.

At stage 1110, the method includes determining a mobility state. The UE 200, including the general-processor 230 and the transceiver 215, is a means for determining the mobility state. In an example, referring to FIG. 10, the UE 200 is configured to obtain measurement values such as RSRP and RSRQ from current serving cells (e.g., primary and secondary cells) and neighbor cells to determine whether the UE 200 is in a low mobility state. In an example, the MG configuration information may include threshold values associated with the RSRP and RSRQ measurements to establish whether the UE 200 is in a low mobility state. In an example, the difference between the measured values and the thresholds may be used to determine the periodicity.

At stage 1112, the method includes measuring or transmitting one or more positioning reference signals based at least in part on the measurement gap information and the mobility state. The UE 200, including the general-processor 230 and the transceiver 215, is a means for measuring or transmitting the one or more PRS. When the UE 200 is determined to be in a low mobility state at stage 1110, the UE 200 may repurpose some MGs to receive DL-PRS or to transmit UL-SRS for positioning. In an example, the LMF 120 may request a position estimate at a future time 'T' and the gNB may instruct the UE 200 to relax the mobility measurements during a period before or around the time 'T' (e.g., 0.5, 1, 5, 10, 20 seconds, etc.). The UE 200 may be configured to request additional MGs when the assistance is received, or before measuring or transmitting the PRS based on the scheduled time 'T.'

In an example, the gNB may configure the UE 200 to monitor the N best neighbor cells (e.g., best 3, best 5, etc.) of on a carrier until the mobility signal measurements (e.g., RSRP, RSRQ) one of the N cells fall below a certain threshold. The N best neighbor cells may have relatively better RSRP and/or RSRQ measurements of a group of M neighbor cells (where M>N). This enables the UE 200 to utilize fewer MGs for mobility purposes and the additional MGs may be used to measure or transmit PRS. The additional MGs may reduce the time to perform the PRS actions and thus improve the overall session latency. Monitoring the N best neighbor cells reduces the impact on mobility performance and reliability due to the mobility relaxation. In an example, the gNB may send a message indicating that the UE 200 is to end the mobility relaxation (e.g., for the UE to tighten mobility measurements back to the previous periodicity).

The measurements obtained by the UE 200 (e.g., based on measured DL-PRS) and the gNB (e.g., based on measured UL-SRS) may be used to obtain a position estimate for the UE 200 based on ranging and multilateration techniques as known in the art.

Figure 12:
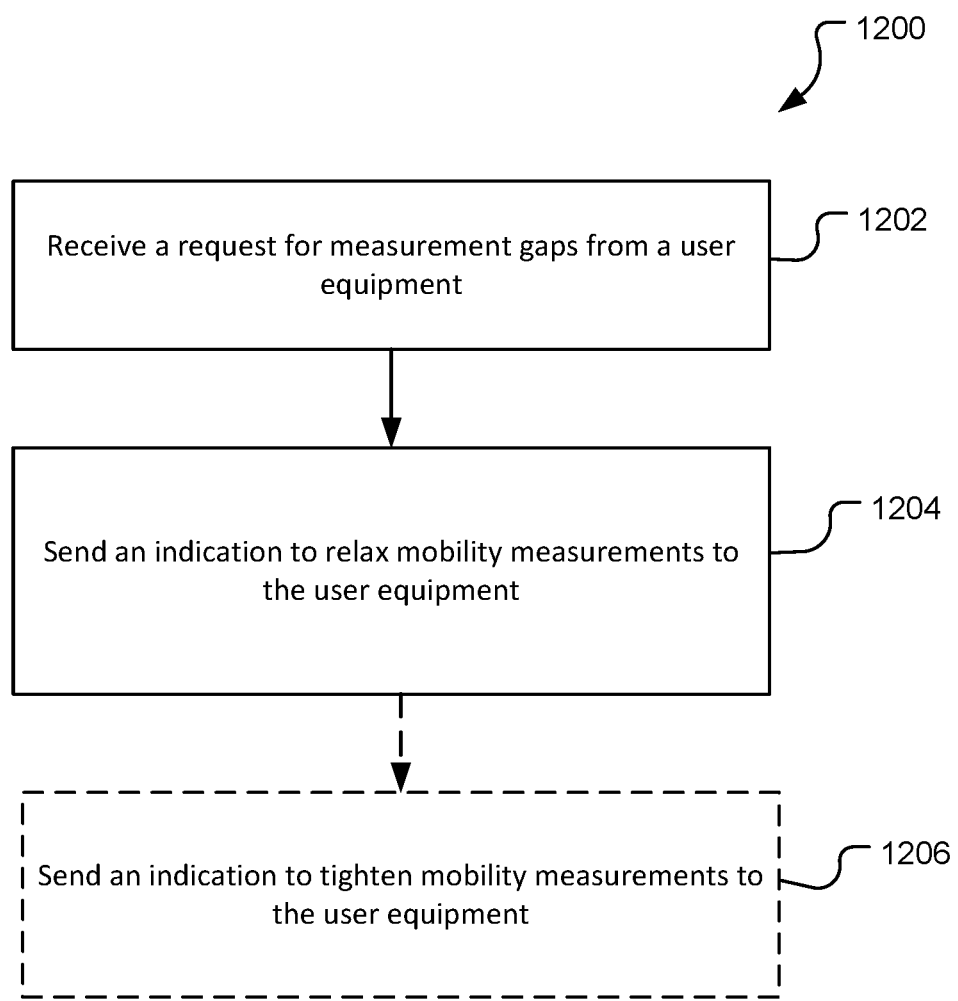
FIG. 12 is a process flow of an example method for increasing a number of measurement gaps for positioning measurements.

Referring to FIG. 12, with further reference to FIGS. 1-11, a method 1200 for increasing a number of measurement gaps for positioning measurements includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes receiving a request for measurement gaps from a user equipment. A TRP 300 such as the gNB 110a, including a processor 310 and a transceiver 315, is a means for receiving a request for MGs. In an example, a location server such as the LMF 120, may initiate a position session to request location information from a UE 200. One or more assistance data messages including PRS configuration information may be provided to the UE 200 and a serving TRP 300. The UE 200 may be configured to determine if additional MGs will be required and provide a request to the TRP 300 for additional MGs. The request for MGs may be included in a RRC measurement indication message. Other signaling may also be used to receive the request for MGs.

At stage 1204, the method includes sending an indication to relax mobility measurements to the user equipment. The TRP 300, including the processor 310 and the transceiver 315, is a means for sending the indication to relax mobility measurements. In an embodiment, the TRP 300 may be configured to provide additional MGs to the UE 200 to enable the UE 200 to receive or transmit positioning signals. The TRP 300 may also be configured to determine that additional MGs will not be sufficient in number to enable the UE 200 to complete the positioning measurements within a prescribed time (e.g., before a positioning session timeout) and provide the indication to relax the mobility measurements to the UE 200. The indication to relax the mobility measurements may enable the UE 200 to repurpose one or more RRM/RLM MGs for use with positioning signals when the UE 200 is in a low mobility state. The indication to relax the mobility measurements may include one or more additional parameters to further define or constrain when and how the UE 200 may relax the mobility measurements. For example, the indication may include signal level power threshold and/or a signal quality threshold values to define a low mobility state. The indication may include a mobility measurement periodicity value (e.g., MGRP 708) for relaxed mobility measurements. In an example, the periodicity may be based at least in part on the current measured mobility signal values. For example, a high RSRP value may enable a longer periodicity because the UE is likely to remain in a low mobility state for a longer period. The indication may include time period information defining a duration that the mobility measurements will be relaxed. The indication may include a scaling factor to modify the mobility measurement periodicity. In an example, the indication may include best cell parameter(s) to enable the UE 200 to monitor a subset of neighboring cells for mobility measurements based on a RSRP value or a RSRQ value, and enable the UE 200 to utilize the MGs associated with other cells for positioning measurements. The subset of cells may be selected based on RRM/RLM measurement values, and the best cell parameter (s) may be an integer (e.g., 3, 5, etc.) indicating a number of best cells to use, and/or threshold values for the RSRP or RSRQ measurements to define minimums for identifying a best cell. In an example, the request for measurement gaps may include a time window parameter (i.e., indicating a future time for obtaining position measurements), and the indication may be sent based at least in part on the time window parameter (e.g., on or before the time window). In an embodiment, the number of measurement gaps to be repurposed for positioning may be a function of a QoS requirement for a position estimate based on an application and/or use case requirement. An increased number of mobility measurement gaps may be repurposed to meet a higher positioning related QoS requirement. The indication to relax the mobility measurements may include other parameters to define the mobility MGs which will be repurposed for positioning measurements.

At stage 1206, the method optionally includes sending an indication to tighten mobility measurements to the user equipment. The TRP 300, including the processor 310 and the transceiver 315, is a means for sending the indication to tighten mobility measurements. In an embodiment, the TRP 300 (e.g., a serving cell) may be configured to actively control the duration of the relaxation of the mobility measurements with messages to initiate and then terminate the relaxations. The indication to tighten the mobility measurements may enable the UE 200 to return to the mobility parameters utilized before receiving the indication at stage 1204. In an example, the indication to tighten the mobility measurements may be based on RRM/RLM measurements obtained by the UE 200 during a relaxation period (e.g., based on the N best neighbor cells) and the gNB may determine to end the relaxation period early (e.g., prior to any duration information included in the indication to relax the mobility measurements at stage 1204). The indication to tighten the mobility measurements may utilize RRC messages or other signaling techniques.

Figure 13:
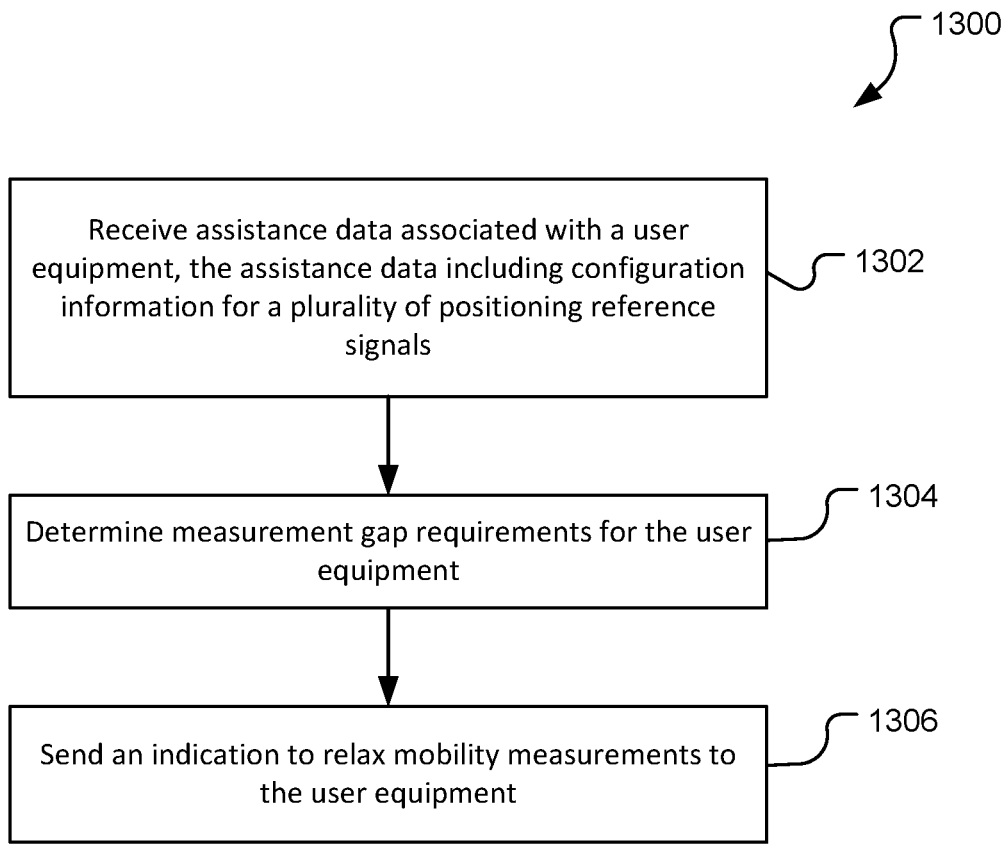
FIG. 13 is a process flow of an example method for providing measurement gaps for positioning measurements.

Referring to FIG. 13, with further reference to FIGS. 1-12, a method 1300 for providing measurement gaps for positioning measurements includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes receiving assistance data associated with a user equipment, the assistance data including configuration information for a plurality of positioning reference signals. A TRP 300 such as the gNB 110a, including a processor 310 and a transceiver 315, is a means for receiving assistance data. In an example, a location server such as the LMF 120, may provide assistance data including PRS resources for DL-PRS and/or UL-SRS which may be utilized by a UE for positioning measurements. The assistance data may be included in one or more NRPPa messages and/or LPP messages addressed to a UE in the coverage area of the TRP 300. The TRP 300 may be configured to provide UEs with MG configurations to enable a UE to obtain inter-frequency signal measurements. The PRS resource information in the assistance data may include timing parameters, and the TRP 300 may be configured to determine an overlap between current MG configurations and the PRS resources in the assistance data.

At stage 1304, the method includes determining measurement gap requirements for the user equipment. The TRP 300, including the processor 310, is a means for determining the measurement gap requirements. In an example, the TRP 300 may determine there is a misalignment between the positioning measurement timing and the available MGs and/or determine that there are and insufficient number of MGs available within a positioning session time period (e.g., before the time-out factor). The number of positioning measurements and measurement gaps may vary based on geographic and other operational considerations such as the distribution of neighboring cells, the range and signal strengths of the neighboring cells, and other signal quality factors such as the presence of multipath. In an example, the TRP 300 may utilize DOP methods to determine a number of positioning measurements required to obtain a position, and then determine if there are a sufficient number of measurement gaps to obtain the desired position measurements. In an example, the required number of measurement gaps may be based on predetermined values (e.g., a look up table) associated with a coarse location of the UE 200 (e.g., based on mobility tracking information). Other factors may also be used to determine the number of positioning measurements and a corresponding number of measurement gaps.

At stage 1306, the method includes sending an indication to relax mobility measurements to the user equipment. The TRP 300, including the processor 310 and the transceiver 315, is a means for sending the indication to relax mobility measurements to the UE. In an embodiment, the indication to relax the mobility measurements may enable a UE to repurpose one or more RRM/RLM MGs for use with positioning signals when the UE is in a low mobility state. In an example, the TRP 300 may be configured to send the indication to relax the mobility measurements to the UE based on determining that the UE is in a low mobility state. The TRP 300 may receive mobility measurements transmitted by the UE and may be configured to perform the method 1000 to determine the UE is in a low mobility state. The indication to relax the mobility measurements may be provided to the UE via RRC messaging, and may include one or more additional parameters to further define or constrain when and how the UE may relax the mobility measurements. For example, the indication may include signal level and signal quality threshold values to define a low mobility state. The indication may include a mobility measurement periodicity for relaxed mobility measurements. In an example, the periodicity may be based at least in part on a difference between the threshold values and the corresponding measured values. The indication may include time period information defining a duration that the mobility measurements will be relaxed. The indication may include a scaling factor to modify the mobility measurement periodicity. In an example, the indication may enable the UE to monitor a subset of cells for mobility measurements, and enable the UE to utilize the MGs associated with other cells for positioning measurements. The subset of cells may be selected based on RRM/RLM measurement values. The indication to relax the mobility measurements may include other parameters to define the mobility MGs which will be repurposed for positioning measurements. In an embodiment, the TRP 300 may be configured to actively control the duration of the relaxation of the mobility measurements with messages to initiate and then terminate the relaxations. For example, the TRP 300 may be configured to send a message via RRC including an indication to tighten the mobility measurements. The indication to tighten the mobility measurements may enable the UE to return to the mobility periodicity to a default value, or to set the mobility periodicity to other values.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300. For example, in an embodiment, the UE 200 may be configured determine the low mobility state and then autonomously relax RRM measurements to repurpose a subset of those measurement gaps for positioning measurements, without requesting measurement gap configuration information from a TRP 300.

Components, functional or otherwise, shown in the figures and/or discussed herein as being connected or communicating with each other are communicatively coupled unless otherwise noted. That is, they may be directly or indirectly connected to enable communication between them.

As used herein, unless otherwise stated, a statement that a function or operation is "based on" an item or condition means that the function or operation is based on the stated item or condition and may be based on one or more items and/or conditions in addition to the stated item or condition.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for increasing a number of measurement gaps for positioning measurements comprising:
receiving a request for measurement gaps from a user equipment; and
sending an indication to relax mobility measurements to the user equipment.

Clause 2. The method of clause 1 wherein the indication to relax the mobility measurement includes at least one of a signal level power threshold value or a signal quality threshold value to define a low mobility state.

Clause 3. The method of clause 1 wherein the indication to relax the mobility measurements includes a mobility measurement periodicity value for relaxed mobility measurements.

Clause 4. The method of clause 3 wherein the mobility measurement periodicity value is based at least in part on a measured mobility reference signal received power level.

Clause 5. The method of clause 1 wherein the indication to relax the mobility measurements includes time period information defining a duration to relax the mobility measurements.

Clause 6. The method of clause 1 wherein the indication to relax the mobility measurements includes a scaling factor to modify a mobility measurement periodicity.

Clause 7. The method of clause 1 wherein the indication to relax the mobility measurements includes a best cell parameter to enable the user equipment to monitor a subset of neighboring cells for mobility measurements based on a reference signal received power value or a reference signal received quality value.

Clause 8. The method of clause 1 further comprising sending an indication to tighten the mobility measurements to the user equipment.

Clause 9. The method of clause 1 wherein the request for the measurement gaps includes a time window parameter, and the indication to relax the mobility measurements is sent based at least in part on the time window parameter.

Clause 10. The method of clause 1 wherein the indication to relax the mobility measurements is sent via a radio resource control message.

Clause 11. The method of clause 1 wherein the indication to relax the mobility measurements is based at least in part on a positioning quality of service requirement.

Clause 12. A method for reducing positioning measurement latency in a wireless network, comprising:
receiving assistance data including configuration information for a plurality of positioning reference signals;
determining measurement gap requirements;
requesting measurement gaps based on the measurement gap requirements;
receiving measurement gap configuration information;
determining a mobility state; and
measuring or transmitting one or more positioning reference signals based at least in part on the measurement gap configuration information and the mobility state.

Clause 13. The method of clause 12 wherein the measuring or the transmitting one or more positioning reference signals occurs during a mobility measurement gap repurposed for positioning measurements.

Clause 14. The method of clause 12 wherein measuring one or more positioning reference signals includes receiving a downlink positioning reference signal, and the transmitting one or more positioning reference signals includes transmitting an uplink sounding reference signal for positioning.

Clause 15. The method of clause 12 wherein the measurement gap configuration information includes at least one of a signal level power threshold value or a signal quality threshold value to define the mobility state.

Clause 16. The method of clause 12 wherein the measurement gap configuration information includes a mobility measurement periodicity value for relaxed mobility measurements.

Clause 17. The method of clause 16 wherein the mobility measurement periodicity value is based at least in part on a measured mobility reference signal received power level.

Clause 18. The method of clause 12 wherein the measurement gap configuration information includes time period information defining a duration to relax the mobility measurements.

Clause 19. The method of clause 12 wherein the measurement gap configuration information includes a scaling factor to modify a mobility measurement periodicity.

Clause 20. The method of clause 12 wherein the measurement gap configuration information includes a best cell parameter to enable monitoring a subset of neighboring cells for mobility measurements based on a reference signal received power value or a reference signal received quality value.

Clause 21. The method of clause 12 further comprising receiving an indication to tighten the mobility measurements.

Clause 22. The method of clause 12 wherein the requesting measurement gaps includes requesting measurement gaps in a time window parameter, and the measurement gap configuration information is received based at least in part on the time window parameter.

Clause 23. The method of clause 12 wherein the requesting measurement gaps and receiving the measurement gap configuration information are conveyed via radio resource control messages.

Clause 24. A method of repurposing measurement gaps, comprising:
  receiving mobility reference signals;
  determining measurement values for the reference signals;
  determining a low mobility state based on the measurement values; and
  relaxing mobility measurements.

Clause 25. An apparatus, comprising:
  a memory;
  at least one transceiver;
  at least one processor communicatively coupled to the memory and the at least one transceiver, and configured to:
  receive a request for measurement gaps from a user equipment; and
  send an indication to relax mobility measurements to the user equipment.

Clause 26. The apparatus of clause 25 wherein the indication to relax mobility measurement includes at least one of a signal level power threshold value or a signal quality threshold value to define a low mobility state.

Clause 27. The apparatus of clause 25 wherein the indication to relax mobility measurements includes a mobility measurement periodicity value for relaxed mobility measurements.

Clause 28. The apparatus of clause 27 wherein the mobility measurement periodicity value is based at least in part on a measured mobility reference signal received power level.

Clause 29. The apparatus of clause 25 wherein the indication to relax mobility measurements includes time period information defining a duration to relax the mobility measurements.

Clause 30. The apparatus of clause 25 wherein the indication to relax mobility measurements includes a scaling factor to modify a mobility measurement periodicity.

Clause 31. The apparatus of clause 25 wherein the indication to relax mobility measurements includes a best cell parameter to enable the user equipment to monitor a subset of neighboring cells for mobility measurements based on a reference signal received power value or a reference signal received quality value.

Clause 32. The apparatus of clause 25 wherein the at least one processor is further configured to send an indication to tighten the mobility measurements to the user equipment.

Clause 33. The apparatus of clause 25 wherein the request for the measurement gaps includes a time window parameter, and the at least one processor is further configure to send the indication to relax mobility measurements based at least in part on the time window parameter.

Clause 34. The apparatus of clause 25 wherein the at least one processor is further configured to send the indication to relax mobility measurements via a radio resource control message.

Clause 35. The apparatus of clause 25 wherein the indication to relax mobility measurements is based at least in part on a positioning quality of service requirement.

Clause 36. An apparatus, comprising:
  a memory;
  at least one transceiver;
  at least one processor communicatively coupled to the memory and the at least one transceiver, and configured to:
  receive assistance data including configuration information for a plurality of positioning reference signals;
  determine measurement gap requirements;
  request measurement gaps based on the measurement gap requirements;
  receive measurement gap configuration information;
  determine a mobility state; and
  measure or transmit one or more positioning reference signals based at least in part on the measurement gap configuration information and the mobility state.

Clause 37. The apparatus of clause 36 wherein the at least one processor is further configured to measure or transmit the one or more positioning reference signals during a mobility measurement gap repurposed for positioning measurements.

Clause 38. The apparatus of clause 36 wherein the at least one processor is further configured to receive a downlink positioning reference signal, and transmit an uplink sounding reference signal for positioning.

Clause 39. The apparatus of clause 36 wherein the measurement gap configuration information includes at least one of a signal level power threshold value or a signal quality threshold value to define the mobility state.

Clause 40. The apparatus of clause 36 wherein the measurement gap configuration information includes a mobility measurement periodicity value for relaxed mobility measurements.

Clause 41. The apparatus of clause 40 wherein the mobility measurement periodicity value is based at least in part on a measured mobility reference signal received power level.

Clause 42. The apparatus of clause 36 wherein the measurement gap configuration information includes time period information defining a duration to relax mobility measurements.

Clause 43. The apparatus of clause 36 wherein the measurement gap configuration information includes a scaling factor to modify a mobility measurement periodicity.

Clause 44. The apparatus of clause 36 wherein the measurement gap configuration information includes a best cell parameter to enable monitoring a subset of neighboring cells for mobility measurements based on a reference signal received power value or a reference signal received quality value.

Clause 45. The apparatus of clause 36 wherein the at least one processor is further configured to receive an indication to tighten the mobility measurements.

Clause 46. The apparatus of clause 36 wherein the at least one processor is further configured to request measurement gaps in a time window parameter, and receive the measurement gap configuration information based at least in part on the time window parameter.

Clause 47. The apparatus of clause 36 wherein the at least one processor is further configured to request measurement gaps and receive the measurement gap configuration information via radio resource control messages.

Clause 48. An apparatus, comprising:
a memory;
at least one transceiver;
at least one processor communicatively coupled to the memory and the at least one transceiver, and configured to:
receive mobility reference signals;
determine measurement values for the reference signals;
determine a low mobility state based on the measurement values; and
relax mobility measurements.

Clause 49. An apparatus for increasing a number of measurement gaps for positioning measurements comprising:
means for receiving a request for measurement gaps from a user equipment; and
means for sending an indication to relax mobility measurements to the user equipment.

Clause 50. An apparatus for reducing positioning measurement latency in a wireless network, comprising:
means for receiving assistance data including configuration information for a plurality of positioning reference signals;
means for determining measurement gap requirements;
means for requesting measurement gaps based on the measurement gap requirements;
means for receiving measurement gap configuration information;
means for determining a mobility state; and
means for measuring or transmitting one or more positioning reference signals based at least in part on the measurement gap configuration information and the mobility state.

Clause 51. An apparatus for repurposing measurement gaps, comprising:
means for receiving mobility reference signals;
means for determining measurement values for the reference signals;
means for determining a low mobility state based on the measurement values; and
means for relaxing mobility measurements.

Clause 52. A non-transitory processor-readable storage medium comprising processor-readable instructions configured to cause one or more processors to increase a number of measurement gaps for positioning measurements comprising code for:
receiving a request for measurement gaps from a user equipment; and
sending an indication to relax mobility measurements to the user equipment.

Clause 53. A non-transitory processor-readable storage medium comprising processor-readable instructions configured to cause one or more processors to reduce positioning measurement latency in a wireless network, comprising code for:
receiving assistance data including configuration information for a plurality of positioning reference signals;
determining measurement gap requirements;
requesting measurement gaps based on the measurement gap requirements;
receiving measurement gap configuration information;
determining a mobility state; and
measuring or transmitting one or more positioning reference signals based at least in part on the measurement gap configuration information and the mobility state.

Clause 54. A non-transitory processor-readable storage medium comprising processor-readable instructions configured to cause one or more processors to repurpose measurement gaps, comprising code for:
receiving mobility reference signals;
determining measurement values for the reference signals;
determining a low mobility state based on the measurement values; and
relaxing mobility measurements.

The invention claimed is:
1. A method for reducing positioning measurement latency in a wireless network, comprising:
receiving assistance data including configuration information for a plurality of positioning reference signals;
determining measurement gap requirements;
requesting measurement gaps based on the measurement gap requirements;
receiving measurement gap configuration information;
determining a mobility state; and
measuring or transmitting one or more positioning reference signals based at least in part on the measurement gap configuration information and the mobility state.

2. The method of claim 1 wherein the measuring or the transmitting one or more positioning reference signals occurs during a mobility measurement gap repurposed for positioning measurements.

3. The method of claim 1 wherein measuring one or more positioning reference signals includes receiving a downlink positioning reference signal, and the transmitting one or more positioning reference signals includes transmitting an uplink sounding reference signal for positioning.

4. An apparatus, comprising:
a memory;
at least one transceiver;
at least one processor communicatively coupled to the memory and the at least one transceiver, and configured to:
receive assistance data including configuration information for a plurality of positioning reference signals;
determine measurement gap requirements;

request measurement gaps based on the measurement gap requirements;
receive measurement gap configuration information;
determine a mobility state; and
measure or transmit one or more positioning reference signals based at least in part on the measurement gap configuration information and the mobility state.

5. The apparatus of claim 4 wherein the at least one processor is further configured to measure or transmit the one or more positioning reference signals during a mobility measurement gap repurposed for positioning measurements.

6. The apparatus of claim 4 wherein the at least one processor is further configured to receive a downlink positioning reference signal, and transmit an uplink sounding reference signal for positioning.

7. The apparatus of claim 4 wherein the measurement gap configuration information includes at least one of a signal level power threshold value or a signal quality threshold value to define the mobility state.

8. The apparatus of claim 4 wherein the measurement gap configuration information includes a mobility measurement periodicity value for relaxed mobility measurements.

9. The apparatus of claim 8 wherein the mobility measurement periodicity value is based at least in part on a measured mobility reference signal received power level.

10. The apparatus of claim 4 wherein the measurement gap configuration information includes time period information defining a duration to relax mobility measurements.

11. The apparatus of claim 4 wherein the measurement gap configuration information includes a scaling factor to modify a mobility measurement periodicity.

12. The apparatus of claim 4 wherein the measurement gap configuration information includes a best cell parameter to enable monitoring a subset of neighboring cells for mobility measurements based on a reference signal received power value or a reference signal received quality value.

13. The apparatus of claim 4 wherein the at least one processor is further configured to receive an indication to tighten the mobility measurements.

14. The apparatus of claim 4 wherein the at least one processor is further configured to request the measurement gaps in a time window parameter, and receive the measurement gap configuration information based at least in part on the time window parameter.

15. The method of claim 1 wherein the measurement gap configuration information includes at least one of a signal level power threshold value or a signal quality threshold value to define the mobility state.

16. The method of claim 1 wherein the measurement gap configuration information includes a mobility measurement periodicity value for relaxed mobility measurements.

17. The method of claim 16 wherein the mobility measurement periodicity value is based at least in part on a measured mobility reference signal received power level.

18. The method of claim 1 wherein the measurement gap configuration information includes time period information defining a duration to relax the mobility measurements.

19. The method of claim 1 wherein the measurement gap configuration information includes a scaling factor to modify a mobility measurement periodicity.

20. The method of claim 1 wherein the measurement gap configuration information includes a best cell parameter to enable monitoring a subset of neighboring cells for mobility measurements based on a reference signal received power value or a reference signal received quality value.

21. The method of claim 1 further comprising receiving an indication to tighten the mobility measurements.

22. The method of claim 1 wherein the requesting measurement gaps includes requesting measurement gaps in a time window parameter, and the measurement gap configuration information is received based at least in part on the time window parameter.

23. The method of claim 1 wherein the requesting measurement gaps and receiving the measurement gap configuration information are conveyed via radio resource control messages.

24. The apparatus of claim 4 wherein the at least one processor is further configured to request measurement gaps and receive the measurement gap configuration information via radio resource control messages.

25. An apparatus for reducing positioning measurement latency in a wireless network, comprising:
means for receiving assistance data including configuration information for a plurality of positioning reference signals;
means for determining measurement gap requirements;
means for requesting measurement gaps based on the measurement gap requirements;
means for receiving measurement gap configuration information;
means for determining a mobility state; and
means for measuring or transmitting one or more positioning reference signals based at least in part on the measurement gap configuration information and the mobility state.

26. The apparatus of claim 25 wherein the measuring or the transmitting one or more positioning reference signals occurs during a mobility measurement gap repurposed for positioning measurements.

27. The apparatus of claim 25 wherein measuring one or more positioning reference signals includes receiving a downlink positioning reference signal, and the transmitting one or more positioning reference signals includes transmitting an uplink sounding reference signal for positioning.

28. A non-transitory processor-readable storage medium comprising processor-readable instructions configured to cause one or more processors to reduce positioning measurement latency in a wireless network, comprising code for:
receiving assistance data including configuration information for a plurality of positioning reference signals;
determining measurement gap requirements;
requesting measurement gaps based on the measurement gap requirements;
receiving measurement gap configuration information;
determining a mobility state; and
measuring or transmitting one or more positioning reference signals based at least in part on the measurement gap configuration information and the mobility state.

29. The non-transitory processor-readable storage medium of claim 28 wherein the measuring or the transmitting one or more positioning reference signals occurs during a mobility measurement gap repurposed for positioning measurements.

30. The non-transitory processor-readable storage medium of claim 28 wherein measuring one or more positioning reference signals includes receiving a downlink positioning reference signal, and the transmitting one or more positioning reference signals includes transmitting an uplink sounding reference signal for positioning.

* * * * *